Aug. 26, 1958　　　　L. SKIPWITH, JR　　　　2,849,208
VALVE MECHANISM FOR SPRAYERS
Filed July 26, 1954　　　　　　　　　　　　　　2 Sheets-Sheet 1

INVENTOR
Lee Skipwith, Jr.
BY Munson H. Lane
ATTORNEY

Aug. 26, 1958  L. SKIPWITH, JR  2,849,208
VALVE MECHANISM FOR SPRAYERS
Filed July 26, 1954  2 Sheets-Sheet 2

INVENTOR
Lee Skipwith, Jr.
BY Munson H. Lane
ATTORNEY

United States Patent Office 2,849,208
Patented Aug. 26, 1958

2,849,208

VALVE MECHANISM FOR SPRAYERS

Lee Skipwith, Jr., St. Petersburg, Fla., assignor to Sprayers & Nozzles, Inc., St. Petersburg, Fla., a corporation of Florida Application July 26, 1954, Serial No. 445,692

1 Claim. (Cl. 251—211)

The invention relates to an improved valve mechanism and operating means therefor, particularly adapted for use with sprayers or the like but in its broadest aspects applicable for use in other relations as well.

My improved valve mechanism preferably comprises a valve ball or the like which is freely movable within limits in a portion or section of a conduit or pipe having a fluid passageway therethrough which is provided with seats for the valve at opposite ends thereof so that when the ball is forced against either seat passage of fluid will be cut off. Engagement of the ball with the seat at what may be termed the outlet end of the pipe section will cut off flow of fluid from a source of liquid under pressure, as for example a city water supply, while engagement of the ball with the seat at the other end of the pipe section will prevent back flow into the source of liquid under pressure, thus avoiding contamination of the water supply or other liquid such as would occur if an insecticide or other poisonous liquid were permitted to flow backward through the pipe section controlled by the ball. The ball is adapted to be manually actuated by means of a suitable plunger comprising a longitudinally reciprocable valve actuator controlled by means of a rotatable plunger extending transversely of the fluid passageway and provided with a cam or eccentric portion adapted to coact with the valve actuator. The plug is provided with a readily accessible handle portion for rotation of the plug and such plug is frictionally mounted in its passage so that it will remain in any designated position whereby the degree of opening in the valve may be accurately determined. The valve mechanism may be swivelly connected at one end with a garden hose or the like, and may be provided with means at its other end for attachment to a suitable sprayer nozzle. It may also be equipped with means for ready attachment of a jar or the like containing spraying fluid to be supplied to the nozzle when the valve mechanism is used in connection with an insecticide sprayer or the like.

My improved valve mechanism is of a unique design and has numerous advantages, among which may be mentioned the following:

(1) It may be made by a screw machine operation with a minimum of secondary operations. It is, therefore, relatively easy to construct, and inexpensive.

(2) It will control not only "on" and "off" of the flow of water, but of equal importance it will accurately control the volume of water allowed to pass through the valve.

(3) Regardless of the position of the control on the valve it is always positively siphon proof.

(4) My improved device preferably incorporates a swivel feature of the hose nut for attachment to the garden hose so as to make it easier for the user to hook the device up.

(5) The valve mechanism involves no lapped surfaces nor critical dimensions. It is simple to manufacture and yet will stand almost indefinite use before there should be any need of any type of maintenance.

One other common type of device for controlling the flow of water currently on the market is the lapped, tapered seat arrangement whereby such a seat is fitted with a plug with an adjustment nut for tightness. These are dependent upon metal to metal precision surfaces for preventing leakage and are relatively expensive to manufacture. Other devices on the market include the use of screw threads such as a faucet as it is known in the home. This involves a considerable number of turns before the user can adjust from maximum to minimum amount of flow. It is not convenient for use on any device working from a hose in a person's yard. Still other devices are made of molded compounds of one sort or another that are permanently affixed to the device as far as the user is concerned. This makes it extremely difficult, if not impossible to attempt to maintain service in the field should foreign matter become lodged in the valve.

Of equal importance to everything else is the fact that no other valve known to me has the automatic back siphonage feature built into it that will operate regardless of the position of any of the rest of the valve.

Another type of valve that is on the market involves plungers, sliding axially within a packing of some sort. This type of valve always has a tendency to leak, requires adjustment and tends to stick. In addition, in this type of a valve it is very difficult to control the amount of flow without a screw thread adjustment of some sort. Generally, this type of valve is either "on" or "off" unless held manually in an in-between position, whereas my improved valve mechanism will maintain its position without further attention by the user.

The invention will be more readily understood by reference to the accompanying drawings and the following detailed description, in which an illustrative embodiment of the invention is specifically set forth by way of illustration rather than by way of limitation.

Figure 6:
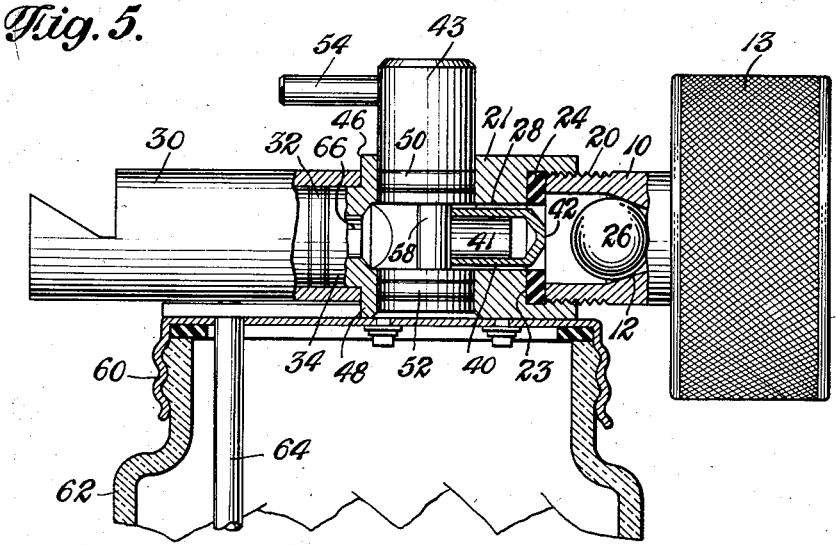
Fig. 6 is a sectional view similar to Fig. 5 but showing the valve ball in back flow preventing position.

Referring to the drawings, reference numeral 10 denotes a ball housing pipe section having a fluid passage therethrough, the interior of which section is tapered toward the inlet end as indicated at 12, and it is herein shown as provided at the inlet end with a hose nut 13 swivelly connected to the pipe section 10, which nut is internally threaded as at 14 to receive the externally threaded end 15 of a garden hose or the like 16 indicated in dash lines, which hose may be connected to a suitable source of fluid under pressure, as for example the city water supply. A suitable hose washer 17 may be employed and if desired a strainer 18 may be included held in place by the washer 17. The ball housing pipe section 10 is externally threaded at its outlet end 20 for connection to a body member 21 herein shown as provided with an internally threaded nipple 22 and a shoulder 23 for engagement with a disk gasket 24 which is tightly held between the body member 21 and the pipe section 10, and which is adapted to serve as a seat for a valve ball member 26. The disk gasket 24 may be of any suitable resilient material such as rubber, either natural or synthetic, though synthetic material capable of resistance to chemical action is preferred and the material known as "Fairprene" has been found satisfactory in practice. The valve ball 26 may be of bronze or other suitable material designed to withstand the corrosive action of chemicals, if any, which may be furnished through the supply line and is loosely movable within the enlarged portion of the fluid passage 11 of the pipe section 10. When forced into engagement with the seat 24 the flow of fluid to the outlet end of the pipe section is prevented, while when the ball comes in contact with the tapered passage 12, as indicated in Fig. 6, back flow into the hose 16 is prevented. The body member 21 has a fluid passage 28 extending longitudinally therethrough and communicating with passage 11 of the valve ball housing pipe section 10. The two parts 21 and 10 may be together considered as constituting the body or stationary portion of my improved valve mechanism. To the outlet end of the body member 21 may be attached a suitable nozzle 30. To insure a fluidtight fit with the nozzle an O-ring 32, preferably of chemically resistant synthetic rubber or the like, may be provided, herein shown as mounted in a groove in a nipple 34 at the outlet end of the body member 21.

Figure 1:
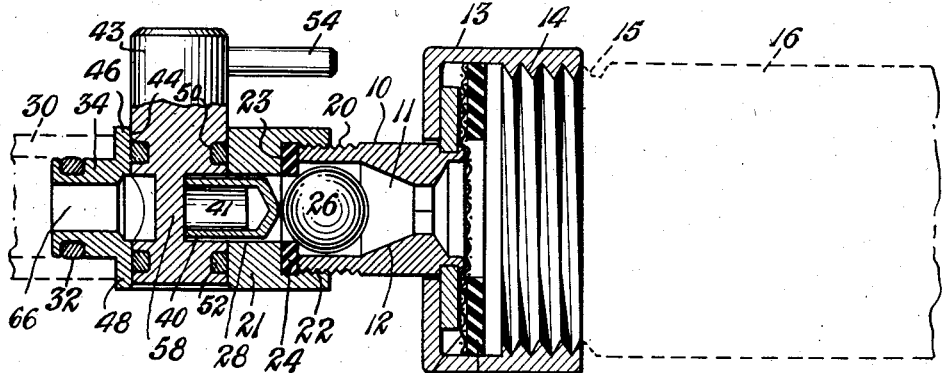
Fig. 1 is a longitudinal section with parts shown in elevation, showing my improved valve mechanism provided at one end with means for attachment to a garden hose shown fragmentarily in broken lines, and at its other end means for attachment to a suitable sprayer nozzle, the valve ball being shown in position to shut off flow of fluid from the hose to the nozzle.
Figure 2:
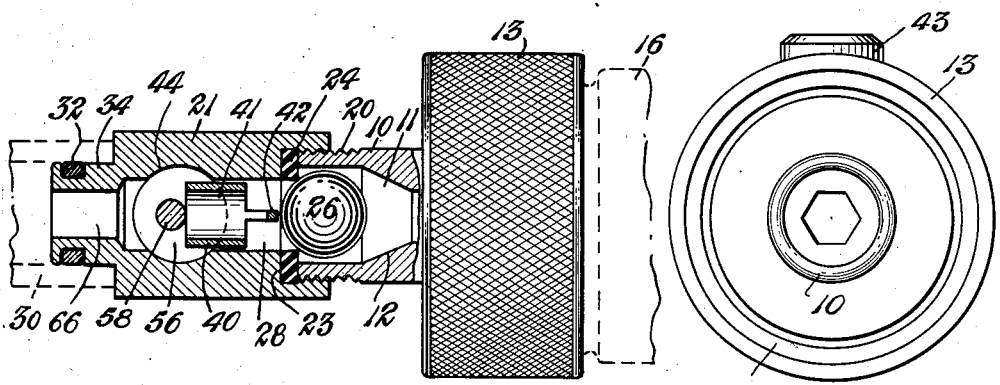
Fig. 2 is a section on line 2—2 of Fig. 1, parts being shown in elevation.
Figure 3:
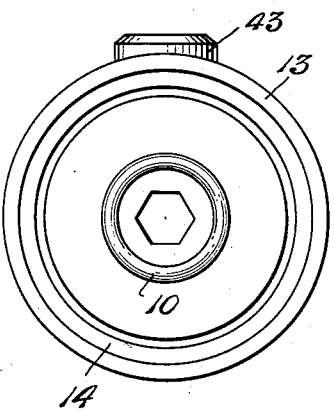
Figs. 3 and 4 are views from opposite ends of the valve mechanism.
Figure 4:
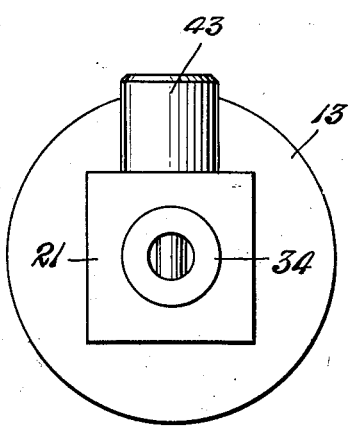
Figure 5:
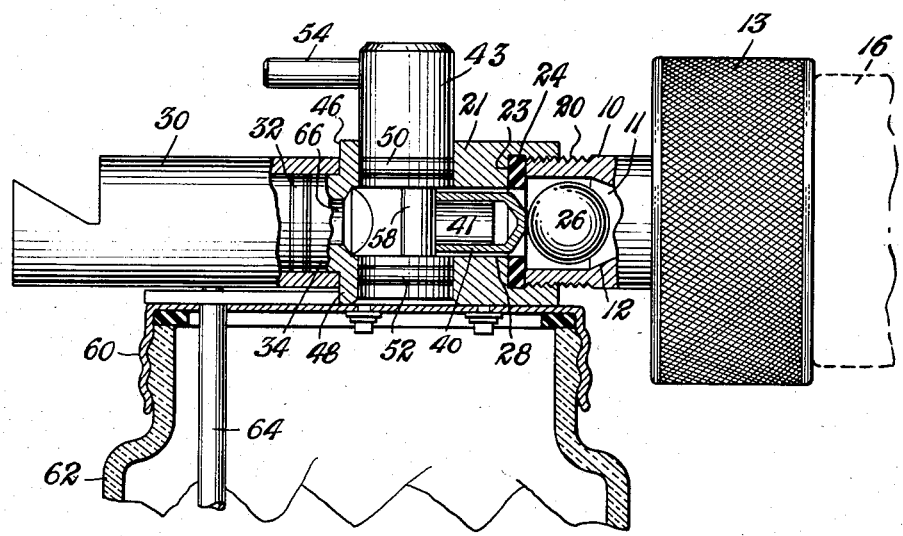
Fig. 5 is a view similar to Fig. 1 but showing the valve ball removed from its seat by manual actuation, and also showing a spray nozzle attachment and a source of sprayer fluid more fully indicated than in Fig. 1.

As previously stated the valve ball 26 will be forced against the gasket 24 in one direction to close off flow of water through the spraying system, and may be forced against the inclined portion 12 of the pipe section 10 by vacuum or suction to prevent back flow in the opposite direction. The valve ball 26 is adapted to be manually opened to a predetermined degree by means of a hollow reciprocable valve actuator member 40 having a fluid passage 41 therethrough, and having an extension 42 at one end thereof for engagement with the ball 26 to remove it from its seat when said actuator member 40 is moved toward the right to a position indicated in Fig. 5. It will be understood that the position indicated in Fig. 5 is the fully open position while that in Fig. 1 is the fully closed position, and that in intermediate positions regulated quantities of liquid may be passed through the valve mechanism. Manual actuation of the member 40 may be effected by rotation of a plug 43 seated in a transverse passage 44 in the body member 21 which is provided with transverse nipples 46 and 48 constituting bearings for the rotatable plug 43. O-rings 50 and 52 may be provided within grooves in the plug to seal the transverse passage and prevent fluid leakage. The plug 43 may be provided with a suitable handle 54 for rotation of the plug. The plug is shown as cut away as at 56 where the plug intersects the fluid passageway 28 through the body member 21, leaving an eccentric or cam portion 58 which, when the handle is in the position shown in Fig. 1, allows the valve ball 26 to tightly seat in the opening in the gasket 24, but when rotated toward the position indicated in Fig. 5 the reciprocable valve actuator 40 gradually forces the valve ball 26 from its seat to the fully open position. It will be understood that the plug 43 will remain in its extreme or any intermediate position by reason of the friction resulting from the presence of the O-rings 50 and 52.

The plug housing body member 21 may have secured thereto a screw cap 60 for attachment of a glass jar or the like 62 constituting a holder for spray fluid which may be drawn from the jar 62 by means of a siphon or other tube 64 communicating at one end with the nozzle 30 and having its other leg extending into the fluid within the jar 62. The withdrawal of spray fluid from the jar 62 may be effected by vacuum or other means created by the flow of water or other pressure fluid from the hose 16 through the communicating fluid passages within the ball housing pipe section 10 and body member 21 and the passage 66 within the sprayer nozzle.

The operation of the device will be largely apparent from the foregoing description, but may be briefly reviewed as follows: The hose nut 13 is connected to the garden hose 16 using hose washer 17 to prevent leakage while the screen 18 prevents large particles from entering the device, particularly when using home supplied water. With the handle 54 of the plug 43 pointed toward the hose nut as indicated in Fig. 1 the valve eccentric 58 will be at its maximum distance away from the source of liquid flow. This permits the pressure of the water against the valve ball 26 to first of all push the valve pin or actuator member 41 out of the way since there is ample room in the recess 56 of the plug 43 to permit the ball 26 to seat against the Fairprene disk washer 24, thereby preventing any flow of water from the water supply to pass through the valve mechanism. In case of back siphonage the ball 26 is immediately drawn toward the source of water and sealed against the tapered conical portion 12 of the pipe section 10. It will be apparent that the plug 43 cannot come out of position because there is not sufficient room for the valve pin or actuator 41 to completely leave the slot 50 in the plug 43. This serves to lock the plug in place without the use of more complicated fastening devices. Moreover, the valve plug is sealed from leakage by the use of the two O-rings 50 and 52. Furthermore, prevention of leakage in the system is provided by the hose washer 17 and the Fairprene disk or gasket 24 as well as by O-ring 32 which seals the nozzle 30. When the valve ball 26 is moved to the open position shown in Fig. 5 a free flow of fluid from the hose 16 is permitted through the entire assembly, thereby creating a vacuum within the pipe 64 which draws sprayer fluid from the container 62 which will be mixed with the water and discharged from the outlet of the nozzle 30. Since most sprayer fluids are of a poisonous nature it is essential that back flow be prevented, and this is insured by the loose mounting of the ball 26 and the provision of the conical seat 12, the ball 26 being shown in its back flow preventing position in Fig. 6. It will be obvious that accurate control of the degree of opening of the valve ball 26 between the position shown in Figs. 1 and 5 may be had by moving the handle 54 and plug 43 to a desired intermediate position between those shown in the two figures. Thus, the operator has complete control of the amount of water passed through the valve mechanism between zero and maximum capacity. It will be further noted that back flow is positively prevented regardless of the position of the valve actuator since the ball 26 is capable of movement independent of the actuator.

The invention has been described in detail for the purpose of illustration together with a preferred method of operation. It is not the intention to limit the device to the applications described above. This shut-off valve will work on any type of liquids provided it is made of appropriate material. For example, it will work on compressed air sprayers where they now generally have a piston type of valve. It will work on power sprayers. It will work on air as well as liquid. It is not limited to insecticides and the agricultural field but can be used on any liquids known to us wherein control of this type is desired. In case of low fluid pressures a spring may be added to the ball to assist it in sealing during the pressure build-up period.

The invention has been described in detail for the purpose of illustration but it will be obvious that many modifications and variations may be resorted to within the scope of the appended claim without departing from the spirit of the invention.

I claim:

In a valve, the combination of a housing provided with a passage having inlet and outlet ends, a valve seat provided in the inlet end portion of said passage, a valve element movably disposed in the passage at the inlet side of said seat and engageable with the latter, a rotatable plug provided in said housing and extending transversely of said passage at the outlet side of said seat, an eccentric provided on said plug in said passage, and a hollow pin slidable in said passage between said seat and said plug and affording communication between portions of the passage at opposite ends of the pin, said pin having an inlet and engageable with said valve element and an outlet end in engagement with said eccentric, whereby the valve element may be disengaged from said seat upon rotation of said plug, a second valve seat provided in the inlet end portion of said passage in spaced opposing relation to the first mentioned seat, said valve element being engageable with said second valve seat independently of actuation of said pin by said plug, said plug being undercut to provide said eccentric, said eccentric being disposed wholly within the undercut portion of the plug and spaced radially inwardly from the lateral surface of the plug, and said second valve seat providing stop means for said valve element and for said pin, whereby the outlet end portion of the pin at all times projects into the undercut portion of the plug and constitutes sole means for preventing removal of the plug from said housing.

References Cited in the file of this patent

UNITED STATES PATENTS

| | | |
|---|---|---|
| 1,225,238 | Gray | May 8, 1917 |
| 1,264,293 | Gower | Apr. 30, 1918 |
| 2,381,589 | Hayes | Aug. 7, 1945 |
| 2,520,976 | Stropp | Sept. 5, 1950 |
| 2,537,798 | Smith | Jan. 9, 1951 |
| 2,606,068 | Bonacor | Aug. 5, 1952 |
| 2,675,829 | Livers | Apr. 20, 1954 |